(12) United States Patent
Schewitz

(10) Patent No.: US 6,537,449 B2
(45) Date of Patent: Mar. 25, 2003

(54) LIQUID FILTER USING FILTRATION AID

(76) Inventor: Jonathan Schewitz, 82 Devereax Avenue, Vincent, East London, Cape Province (ZA)

( * ) Notice: Subject to any disclaimer, the term of this patent is extended or adjusted under 35 U.S.C. 154(b) by 0 days.

(21) Appl. No.: 09/840,842

(22) Filed: Apr. 24, 2001

(65) Prior Publication Data

US 2001/0037965 A1 Nov. 8, 2001

(30) Foreign Application Priority Data

May 3, 2000 (ZA) .......................................... 2000/2144

(51) Int. Cl.⁷ ...................... B01D 29/15; B01D 29/52; B01D 29/88; B01D 37/02
(52) U.S. Cl. ...................... 210/193; 210/323.1; 210/332
(58) Field of Search ................... 210/193, 314, 210/323.1, 323.2, 332

(56) References Cited

U.S. PATENT DOCUMENTS

| | | | | |
|---|---|---|---|---|
| 1,450,560 A | * | 4/1923 | Morton | |
| 2,547,277 A | * | 4/1951 | Marsh et al. | |
| 3,309,177 A | * | 3/1967 | Goerg | 210/511 |
| 3,310,174 A | * | 3/1967 | Hornbostel | |
| 3,715,033 A | * | 2/1973 | Soriente | |
| 3,779,386 A | * | 12/1973 | Ryan | |
| 3,856,682 A | * | 12/1974 | Summers | 210/294 |
| 4,704,210 A | * | 11/1987 | Boze et al. | |
| 5,441,633 A | * | 8/1995 | Schewitz | |

FOREIGN PATENT DOCUMENTS

DE          1410811      * 11/1970

* cited by examiner

*Primary Examiner*—Fred Prince
(74) *Attorney, Agent, or Firm*—David W. Carstens; Carstens, Yee & Cahoon, LLP

(57) ABSTRACT

A liquid filter is provided of the type having a filter container with an inlet through the side of the container towards the lower end thereof, an outlet from the container, and a filter medium interposed between the inlet and outlet. The filter is adapted to utilize a filtration aid and to operate on the basis that at the termination of an operating cycle, filtration aid and dirt fall to the bottom of the container. The filtration aid and at least some dirt becomes stirred up and re-coated on the filter medium by liquid flowing into the container when the filter is started up once more. The inlet is fitted with a manifold having at least two outlet ports adapted to direct a portion of the inlet liquid in each of at least two generally opposite or substantially divergent directions.

18 Claims, 1 Drawing Sheet

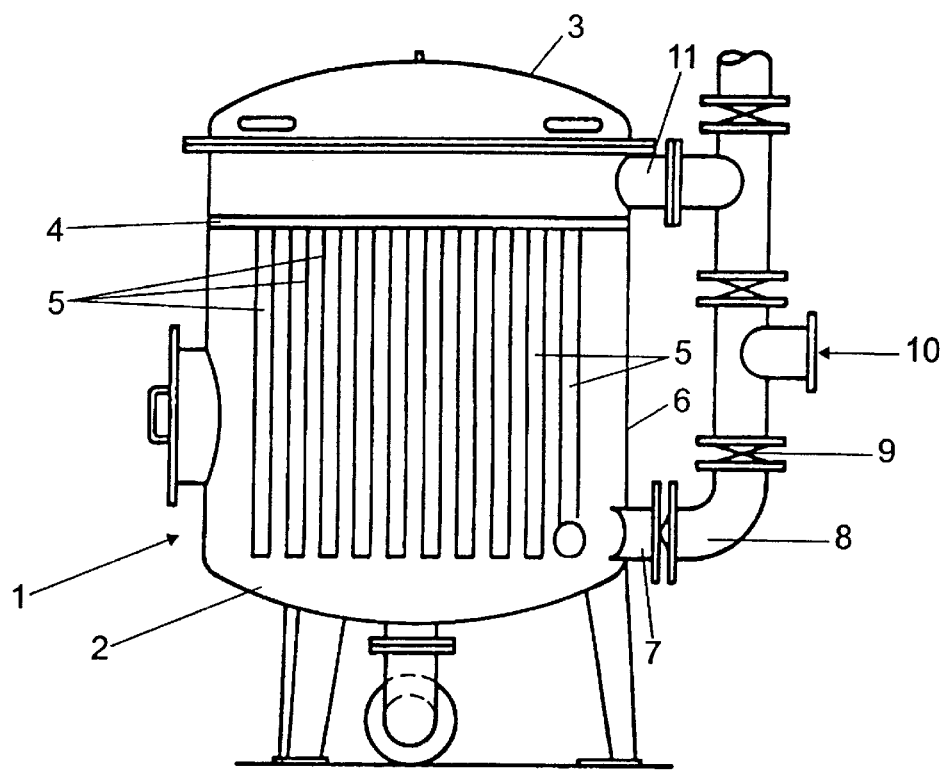
Fig 1
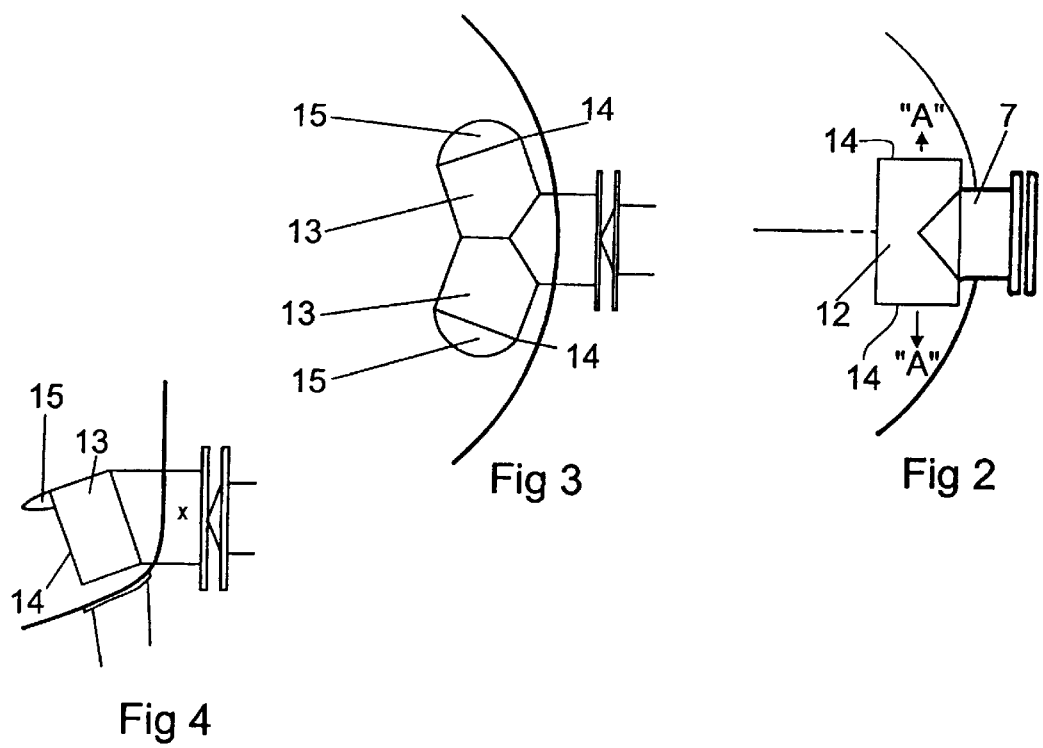
Fig 3
Fig 2
Fig 4

LIQUID FILTER USING FILTRATION AID

The present application claims foreign priority benefits under 35 U.S.C. §119 for Patent Application Ser. No. 2000/2144 filed in the Republic of South Africa on May 3, 2000, and entitled "Liquid Filter Using a Filtration Aid."

BACKGROUND OF THE INVENTION

1. Technical Field

The present invention relates to fluid filtration systems. More particularly, the present invention relates to system and method for reducing the abrasive wear of filtration elements which comprises fluid filtration systems.

2. Description of the Related Art

Filters which employ a filter medium and a filtration aid, in order to avoid premature blinding of the filter medium and thereby to extend the cycle time between back washing procedures, generally operate on the principle that when the filter is turned off, the filter aid and dirt collected thereby fall to the bottom of the container. When the filter is started up again, inlet fluid serves to stir up the filtration aid from the bottom of the filter container so that the filter aid becomes coated onto the filter medium once more.

During this start-up process the filtration aid and dirt in the bottom of the container inflict wear on the filter medium which is generally a fabric bag or sleeve. The severity of the wear on the bag or sleeve depends largely on the direction and velocity of the flow of incoming liquid which stirs up the mixture of dirt and filtration aid. It has now been found that, depending on the exact configuration, an inlet arrangement wherein the flow of the incoming liquid directly impinges the filter medium can lead to undue wear on the bag or sleeve at least in the case of some filtration applications.

It is accordingly an object of this invention to provide an inlet arrangement which, whilst providing adequate dispersion of the settled mixture of filtration aid and dirt at start up, nevertheless diminishes the aforementioned abrasive effect on the filter medium fabric, particularly at the lower ends of bags or sleeves which are in the immediate vicinity of the settled dirt and filtration aid.

SUMMARY OF THE INVENTION

In accordance with this invention there is provided a liquid filter comprising a filter container having a generally cylindrical shape, an inlet through the side of the container towards the lower end thereof, an outlet from the container, and a filter medium or support for such filter medium interposed between the inlet and outlet and wherein the filter is adapted to utilize a filtration aid and to operate on the basis that at the termination of an operating cycle, the filtration aid and dirt associated therewith fall to the bottom of the container and the filtration aid and at least some dirt becomes stirred up and re-coated on the filter medium by liquid flowing into the container when the filter is started up once more, the liquid filter being characterized in that the inlet is fitted with a manifold having at least two outlet ports adapted to direct a portion of the inlet liquid in each in generally opposite or substantially divergent directions.

Further features of the invention provide for the manifold to comprise a radially extending inlet duct communicating with a transverse duct having at least two outlet ports directed in opposite or divergent directions; for the cross-sectional size of the inlet duct, the transverse duct, and the outlet ports to be substantially the same; and, if required, for each of the at least two outlet ports to be fitted with a cowl for directing inlet liquid somewhat downwards.

Additionally, the axis of each traverse duct and outlet port can be inclined somewhat downwards towards the bottom of the container but the two outlet ports are, nevertheless, directed in opposite or substantially divergent directions in plan view. In consequence of this arrangement, the velocity of inlet liquid and the force with which dirt and filtration aid carried by the liquid stream contact the bag or sleeve, is substantially diminished in consequence of which the wear on the lower ends of the fabric bags or sleeves is likewise substantially diminished.

In order that the invention may be more fully understood one embodiment thereof will now be described with reference to the accompanying drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a schematic sectional elevation of a liquid filter assembly embodying the expedient of the invention;

FIG. 2 is a schematic plan view of one form of inlet manifold according to the invention;

FIG. 3 is a similar plan view of an alternative form of inlet manifold according to the invention; and, FIG. 4 is a schematic elevation of the inlet manifold illustrated in FIG. 3.

DETAILED DESCRIPTION OF THE DRAWINGS

In the embodiment of the invention illustrated in FIG. 1, the invention is applied to a liquid filter assembly or system comprising a container 1 of a cylindrical shape having a concave lower end 2 and a correspondingly convex lid 3 secured thereto in removable manner. Towards the upper end of the container 1 is a transverse, generally horizontal divider plate 4 which supports the upper ends of an array of generally vertical elongate tubular filtration elements 5 each of which has a filter medium in the form of a fabric sleeve supported on a supporting frame therefore, the detail of which is not illustrated in the drawings.

Located in the side wall 6 of the container 1 towards the bottom thereof is an inlet 7 fitted with a one way non-return valve 8 and connected through a control valve 9 to an inlet connection 10 for the liquid to be filtered.

The upper end of the container 1 has an outlet 11 through the side wall thereof located above the level of the dividing wall 4.

In use, liquid will enter through the inlet 7, pass through the fabric filter medium of the sleeves, and thence up the tubular filter elements 5 into the upper region of the container 1 and exit through the outlet 11. In the type of filter under consideration, the fabric filter medium supports, in the operative condition, a finely subdivided filtration aid which is preferably diatomaceous earth.

At the end of a filtration cycle the diatomaceous earth and the dirt which has been collected on it fall to the bottom of the container 1 and must be stirred up in a substantially even manner when the filter is next started up.

Referring now to FIGS. 1 & 2, as provided by this invention, the inlet 7 is directed radially inwardly and communicates, on the inside of the container 1, with a transverse duct 12 which forms a manifold. As shown in FIG. 2, transverse duct 12 may simply be connected in Tee-fashion to the inlet 7 so that the axis of the transverse duct 12 extends in a substantially circumferential direction. The cross-sectional area of the transverse duct 12 is approximately the same as that of the inlet 7 and, accordingly, a substantially larger area for flow of liquid is provided by the transverse duct 12. Accordingly, the velocity of the inlet liquid will be substantially reduced as it leaves the free ends or outlet ports 14 of the transverse duct 12 in the directions indicated by arrows "A".

Nevertheless, the turbulence created by the flow of the divided inlet liquid in two substantially opposite directions is adequate to stir up the diatomaceous earth and at least some of the dirt at the bottom of the container 1 in order to result in an even layer of diatomaceous earth becoming deposited on the outer surface of the sleeves.

It will be understood that the portions of liquid directed in each of the two opposite circumferential directions will meet at a diametrically opposite location and create substantial turbulence. It is envisaged that, in this embodiment of the invention, it may not be necessary to direct the open ends of the duct in a downwardly inclined direction.

It is, however, within the scope of this invention that the transverse duct 12 of the manifold have two limbs 13 the longitudinal axes of which extend at an obtuse angle to each other as in the case of the embodiment of the invention illustrated in FIG. 3. FIG. 3 also illustrates a further alternative according to the invention in which the outlet ports 14 of each limb 13 is fitted with a cowl 15 extending over the top region of the outlet ports 14 and curved somewhat downwardly to encourage liquid passing out of the outlet ports 14 downwardly at an incline towards the bottom of the container 1.

Also, in this embodiment of the invention, the longitudinal axes of the limbs 13 of the manifold are themselves directed downwardly at an incline to the horizontal as will be clear from FIG. 4.

It will be understood that numerous variations may be made to the embodiments of the invention described above without departing from the scope hereof. Thus the exact configuration of the inlet manifold may be varied widely and, indeed, the manifold may have more than two outlets. Thus, for example, the manifold may have two oppositely directed outlets as described above and a third outlet directed in a radial direction.

The invention therefore provides an extremely simple yet highly effective expedient for the purpose of diminishing wear of fabric filter bags or sleeves particularly towards their lower ends which are closest to settled diatomaceous earth or other filtration aid at the start-up stage of a filtration cycle.

What is claimed is:

1. A liquid filter system comprising:
   (a) a filter container having a generally cylindrical shape;
   (b) an inlet through the side of the container towards the lower end thereof;
   (c) a manifold fitted to the inlet wherein the manifold has a plurality of outlet ports adapted to direct a portion of an inlet liquid in at least two substantially divergent directions within the container, and wherein the cross-sectional area of the inlet, the manifold, and the outlet ports are substantially the same;
   (d) an outlet from the container; and
   (e) a filter medium interposed between the inlet and outlet, wherein
      (i) the filter medium is adapted to utilize a filtration aid, and
      (ii) the filter medium operates on the basis that
         (a) at the termination of an operating cycle, the filtration aid and dirt associated therewith fall to the bottom of the container and
         (b) upon start up, the filtration aid becomes stirred up and re-coated on the filter medium by the inlet liquid flowing into the container.

2. The liquid filter system of claim 1 wherein the manifold further comprises a radially extending inlet duct communicating with a transverse duct having at least two of the plurality of outlet ports directed in substantially divergent directions.

3. The liquid filter system of claim 2 in which the transverse duct is further comprised of two limbs wherein the longitudinal axes of said limbs extend at an obtuse angle.

4. The liquid filter system of claim 3 in which the longitudinal axis of each limb is inclined somewhat downwards towards the bottom of the container.

5. The liquid filter system of claim 3 in which each outlet port is fitted with a cowl which directs the inlet liquid at a somewhat downward inclination.

6. The liquid filter system of claim 2 in which each of the outlet ports from the manifold is fitted with a cowl which directs the inlet liquid at a somewhat downward inclination.

7. The liquid filter system of claim 1 in which each outlet port is inclined somewhat downwards towards the bottom of the container.

8. The liquid filter system of claim 1 wherein the filtration aid comprises diatomaceous earth.

9. The liquid filter system of claim 1 wherein the filtration medium comprises fabric filter bags.

10. A liquid filter system comprising:
    (a) a filter container;
    (b) an inlet through the side of the container towards the lower end thereof;
    (c) a manifold fitted to the inlet wherein the manifold comprises a plurality of outlet ports which direct an inlet liquid in more than one substantially divergent directions within the container, and wherein the cross-sectional area of the inlet, the manifold, and the outlet ports are substantially the same;
    (d) an outlet from the container; and
    (e) a filter medium interposed between the inlet and outlet.

11. The liquid filter system of claim 10, wherein
    (i) the filter medium is adapted to utilize a filtration aid, and
    (ii) the filter medium operates on the basis that
       (a) at the termination of an operating cycle, the filtration aid and dirt associated therewith fall to the bottom of the container and
       (b) upon start up, the filtration aid becomes stirred up and re-coated on the filter medium by the inlet liquid flowing into the container.

12. The liquid filter system of claim 11, wherein the filtration medium comprises fabric filter bags.

13. The liquid filter system of claim 11, wherein the filtration aid comprises diatomaceous earth.

14. The liquid filter system of claim 10 in which each of the outlet ports is fitted with a cowl which directs the inlet liquid at a somewhat downward inclination.

15. The liquid filter system of claim 10, wherein each outlet port is oriented towards the bottom of the container.

16. The liquid filter system of claim 10, wherein the manifold further comprises a radially extending inlet duct communicating with a transverse duct having the plurality of outlet ports directed in substantially divergent directions within the container.

17. The liquid filter system of claim 16, wherein the transverse duct is comprised of two limbs which extend longitudinally at an obtuse angle.

18. The liquid filter system of claim 16, wherein each limb is inclined towards the bottom of the container.

\* \* \* \* \*